US012628796B2

(12) United States Patent
Riat

(10) Patent No.: US 12,628,796 B2
(45) Date of Patent: May 19, 2026

(54) LIVESTOCK BRUSH

(71) Applicant: Hardeep Kaur Riat, San Marcos, CA (US)

(72) Inventor: Hardeep Kaur Riat, San Marcos, CA (US)

( * ) Notice: Subject to any disclaimer, the term of this patent is extended or adjusted under 35 U.S.C. 154(b) by 0 days.

(21) Appl. No.: 18/777,705

(22) Filed: Jul. 19, 2024

(65) Prior Publication Data

US 2026/0020542 A1 Jan. 22, 2026

(51) Int. Cl.
*A01K 13/00* (2006.01)
*A46B 5/00* (2006.01)
*A46B 7/10* (2006.01)
*A46B 9/02* (2006.01)
*A46B 17/02* (2006.01)

(52) U.S. Cl.
CPC .......... *A01K 13/004* (2013.01); *A46B 5/0058* (2013.01); *A46B 5/007* (2013.01); *A46B 7/10* (2013.01); *A46B 9/026* (2013.01); *A46B 17/02* (2013.01); *A46B 2200/1093* (2013.01)

(58) Field of Classification Search
CPC .... A01K 13/004; A46B 5/0058; A46B 5/007; A46B 7/10; A46B 9/026; A46B 17/02; A46B 2200/1093
See application file for complete search history.

(56) References Cited

U.S. PATENT DOCUMENTS

| | | | | |
|---|---|---|---|---|
| 3,175,537 A | * | 3/1965 | Milton ................. | A01K 13/004 119/664 |
| 4,513,467 A | * | 4/1985 | Roncaglione ........... | B60S 3/063 15/DIG. 2 |
| 4,628,562 A | * | 12/1986 | Roncaglione ........... | B60S 3/063 15/179 |
| 5,511,272 A | * | 4/1996 | Belanger ................ | B60S 3/063 403/2 |
| 5,842,440 A | * | 12/1998 | Bell, Jr. ............... | A01K 15/024 119/664 |
| 6,318,298 B1 | * | 11/2001 | Nonay ................. | A46B 13/001 119/609 |
| 7,168,123 B2 | * | 1/2007 | Ennis ...................... | B60S 3/063 15/53.2 |
| 2005/0161003 A1 | * | 7/2005 | van der Poel ....... | A01K 13/004 119/608 |
| 2013/0125828 A1 | * | 5/2013 | Van Der Poel ........ | A01K 13/00 119/609 |
| 2014/0090607 A1 | * | 4/2014 | Dole .................... | A01K 13/004 119/609 |

(Continued)

*Primary Examiner* — Kimberly S Berona
*Assistant Examiner* — Katherine June Walter

(57) ABSTRACT

The present invention provides a mechanically-actuated livestock brush apparatus, for tending to animal livestock, whose movement can be actuated and also controlled via a mechanical means. In an embodiment, the mechanical means may include a spring device. The mechanical means should be such that it provides sufficient resistance for a controlled movement of the brush apparatus preventing infinite movement, e.g., infinitely rotating/revolving, while also provides sufficient resistance such that when an animal pushes against it, it does not move freely or randomly, but puts resistive pressure against the animal's body for a good scratch. Also, the brush apparatus has a universal motion, allowing it to move in multiple directions.

7 Claims, 5 Drawing Sheets

(56) References Cited

U.S. PATENT DOCUMENTS

| | | | |
|---|---|---|---|
| 2015/0020747 A1* | 1/2015 | Mazeris | A01K 13/002 |
| | | | 119/608 |
| 2015/0136039 A1* | 5/2015 | Van Der Poel | A01K 13/004 |
| | | | 119/609 |
| 2018/0110203 A1* | 4/2018 | Kultanen | A46B 5/0091 |
| 2018/0279756 A1* | 10/2018 | Axelrod | A01K 13/002 |

* cited by examiner

104

110

108

106

102

112          114

100

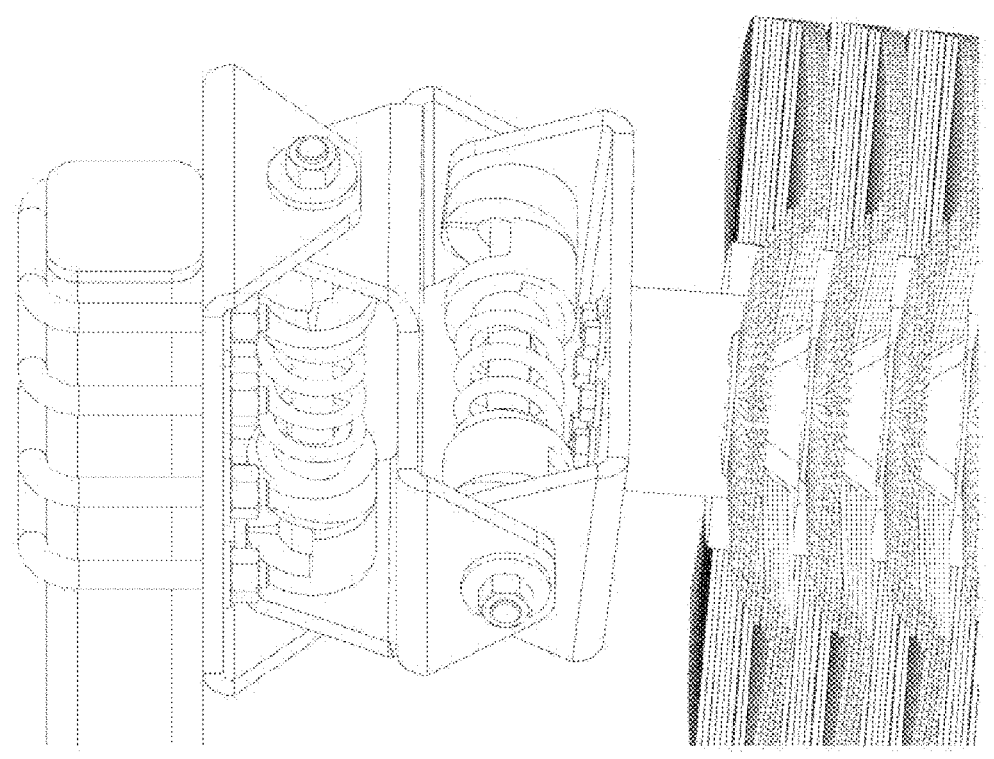
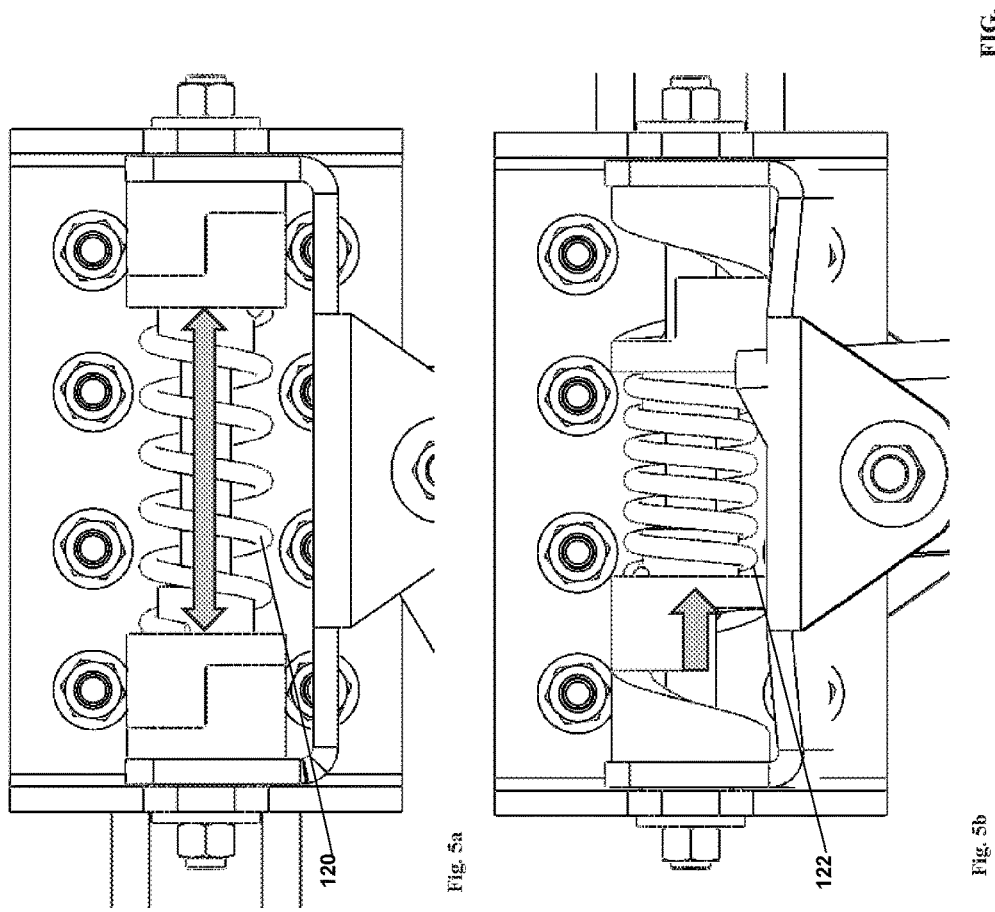
Fig. 5a
Fig. 5b
120
122
FIG. 5

LIVESTOCK BRUSH

The present invention relates generally to animal brushes for brushing and rubbing livestock, and other suitable animal interactions. More particularly, the present invention relates to animal brushes with an actuator.

BACKGROUND OF THE INVENTION

Animals tend their bodies and fur coats by performing actions themselves, such as rubbing their bodies for purposes like itching, for relieving harmful substances, pests, contaminated stools, for other cleanliness purposes, for relieving stress like itching etc. While some of the animal tending activities e.g., brushing their fur coats for stress relieving, detangling, cleanliness, etc., are also performed by humans using conventionally available animal brushes in the market.

To tend their bodies, animals kept in a shelter or enclosure or cages naturally rub their bodies against any object, such as walls, fences, and like. However, while doing this, there are chances when this can injure the animal, if the object is sharp or dirty. Therefore, there is a need of such a device that does not cause injuries to the animals.

Various kinds of scratches or brushes for livestock have been disclosed that allow livestock to tend to their bodies by rubbing, but such brushes are prone to wear and deformation. There can be many reasons for this, for example including material used for the brushes, rubbing direction and the repetitive motion of the animals. This may also lead to insufficient satisfaction or stress relieving to the animals, forcing them to rub more aggressively and potentially causing injury or damaging the brush device Furthermore, it is also seen that such devices actuated by electric motors action which may trigger the start and stop of the brushing device. Due to this, the rubbing action of the brushes may be limitless leading to wastage of energy and wearing out of the device even more quickly. Additionally, only one way movement of the brushing device, e.g., a pendulum motion, may also have a disadvantage of damaging the brush device when the animal pushes against it. Another disadvantage can include free movement of the brush device in pendulum like movement without providing any resistance when the animal rubs against it.

Therefore, there is a need for a livestock brush that is durable, and has a controlled universal motion to rub against the bodies of the livestock.

OBJECTIVES OF THE INVENTION

The present invention is aimed to design and develop an animal brush whose motion can be controlled preventing infinite/limitless movement. It is an objective to design the animal brush which can be actuated by a triggering means, and can be stopped under the diminishing effect of the triggering means.

It is an objective to design the animal brush that does not revolve or move limitlessly, but has limited stops.

It is an objective to design a mechanical actuator to start the movement of the brush, which avoids infinite movement or revolving, and also to eventually stop the movement of the brush due to the inherent diminishing and resistance effect of the mechanical actuator, as will be explained below.

It is an objective of the present invention to design and develop the animal brush with a universal motion, allowing it to move in multiple directions. Specifically, the brush can swing in all directions rather than being restricted to a single type of motion, such as a pendulum-like movement. It is an objective of the present invention to ensure a gratifying scratching experience for animals as they engage with the animal brush.

It is an objective of the present invention to prevent any risk of failure or breakage to the animal brush mechanism or prevent injuries or harm to the livestock, in instances of excessive force.

It is also an objective of the present invention to provide comprehensive coverage for effective scratching.

The objective provides scratching experience from various angles, allowing for a thorough and satisfying scratching experience across a wide surface area.

It is an additional object of the present invention to provide for effortless access to the area beneath the animal brush, ensuring convenient maintenance and upkeep of the surrounding environment.

SUMMARY OF THE INVENTION

An aspect of the present invention provides a livestock brush apparatus for tending to livestock comprising: a brush device 102, actuated and controlled by a spring like mechanism 104, incorporating a bristle section 106 intended for animal interaction; and the spring like mechanism 104 includes at least one spring putting a resistive force or spring tension on the brush device 102 for controlling the movement of the brush device 102 with bristles, and characterised in that the brush device 102 is securely attached to the spring like mechanism 104 via a universal hinge joint 110 which allows the brush device 102 to move in universal direction and not just one single type of motion; characterised in that the spring like mechanism 104 provides the resistive force or spring tension for a controlled movement of the brush device 102 preventing infinite rotating/revolving of the brush device 102, while also prevents a free or random movement of the brush device 102 when an animal pushes against it, but puts a resistive pressure against the animal's body for a scratch, and also to eventually stop the brush device 102 in certain time as the resistive force of the spring like mechanism 104 inherently diminishes with time; and characterised in that the at least one spring in the spring like mechanism 104 is decompressed providing the resistive force or spring tension to the brush device 102 for free directional but controlled movement of the brush device 102, under a normal interaction of an animal with the brush device 102.

An embodiment includes the spring like mechanism 104 further includes a cam device (14, 15) rotating on the axle (16) to compress and decompress the spring in the spring like mechanism 104.

An embodiment provides that under a normal interaction of an animal with the brush device 102 or in the resting state or in both situations, the cam device which includes at least two cams (14, 15) are mating with each other at their matching offset surfaces, and the spring is decompressed, where in one of the cams is fixed while the other is rotatable along the axle (16); while in excessive rotation, the offset surfaces of the cams (14, 15) cause the rotatable cam (15) to move inward, compressing the spring, resulting in the brush device 102 retracting backwards into a downward position, the brush device 102 moves away from the animal, thereby preventing any risk of failure or breakage to the brush apparatus 100 and/or the animal.

An embodiment provides that the brush device 102 includes a brush column 108 and a brush disc 116 with bristles 106 securely attached around its periphery.

Another embodiment includes the bristles 106 are attached all over the brush column 108 to provide a wider access to the animals for interaction.

Another embodiment provides the brush device 102 includes a semi-spherical dome 112, featuring an array of bristles 114 securely attached to the semi-spherical dome 112 to provide a comprehensive coverage for effective scratching from various angles, allowing for a thorough and satisfying scratching experience across a wider surface area.

An embodiment provides that the brush apparatus 100 further includes a mounting bracket (3) for secure attachment of the brush apparatus 100 to a building structure, such as including a wall, a pillar, or analogous structure, in conjunction with a cantilever frame (118) extending from the mounting bracket (3).

Another embodiment provides that the wall mount bracket (3) is designed with a built-in hinge mechanism 124, strategically positioned to enable seamless movement or rotation of the brush apparatus 100, with respect to the wall or the building structure onto which the brush apparatus 100 is mounted.

BRIEF DESCRIPTION OF DRAWINGS

For a better understanding of the embodiments of the systems and methods described herein, and to show more clearly how they may be carried into effect, references will now be made, by way of example, to the accompanying drawings, wherein like reference numerals represent like elements/components throughout and wherein:

FIGS. 5, 5*a* and 5*b* illustrates an exemplary representation of the spring actuating mechanism in relaxed and compressed state, in accordance with an embodiment of the present invention.

DETAILED DESCRIPTION OF INVENTION

Figure 1:
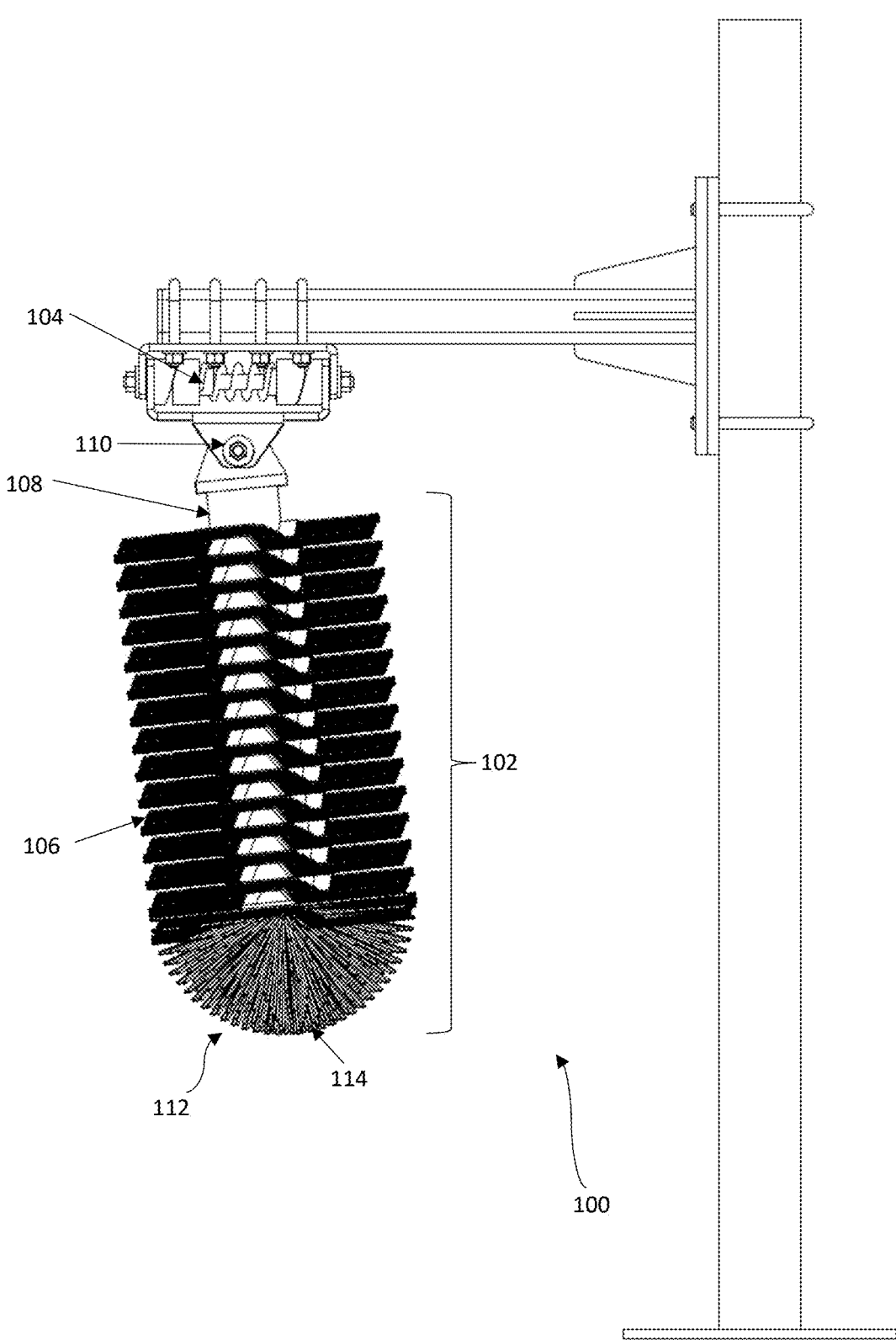
FIG. 1 illustrates an exemplary representation of a spring actuated livestock brush.

This patent describes the subject matter for patenting with specificity to meet statutory requirements. However, the description itself is not intended to limit the scope of this patent. The principles described herein may be embodied in many different forms.

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The present invention provides a mechanically-actuated livestock brush apparatus, for tending to animal livestock, whose movement can be actuated and also controlled via a mechanical means. In an embodiment, the mechanical means may include a spring device. The mechanical means should be such that it provides sufficient resistance for a controlled movement of the brush apparatus preventing infinite movement, e.g., infinitely revolving, while also provides sufficient resistance such that when an animal pushes against it, it does not move freely or randomly, but puts resistive pressure against the animal's body for a good scratch.

Because the mechanical means puts a resistance on the movement of the brush apparatus, it has a limited range of the motion, which eventually stops in certain time as the resistive pressure of the mechanical means inherently diminishes with time.

It may be apparent to a person of ordinary skill in the art that the brush apparatus may be equipped with any type of mechanical means, other than a spring actuating mechanism, which can provide sufficient elasticity and resistance to the brush apparatus for its controlled and limitless movement, without deviating from the meaning and scope of the present invention.

In an embodiment, the brush apparatus features a brush device with a spring actuating mechanism that controls the motion of the brush device. The brush device has a universal joint motion facilitated by the spring mechanism. Essentially, the livestock brush apparatus does not move limitlessly leading to unnecessary movements which can damage the apparatus and is also a wastage of the energy that is applied to move or revolve the brush. Additionally, the brush apparatus has a universal motion defying a single type of movement e.g., a pendulum type movement.

In this embodiment, particularly, the brush apparatus is equipped with a spring-loaded mechanism that acts as an actuator to maintain the brush device in its predefined mounting position. The design ensures that the brush does not revolve endlessly but instead has controlled, limited revolutions as per the requirements or predefined specifications.

Now referring to FIGS. 1-4, the brush apparatus 100 for livestock animals may essentially include a brush device 102 actuated by an elastic mechanical means, e.g., a spring mechanism 104. The brush apparatus 100 features a universal joint motion facilitated by the spring mechanism 104. The shank of the brush device 102 incorporates a bristle section 106 intended for animal interaction.

The spring mechanism 104 delivers sufficient tension to ensure a gratifying scratching experience for animals as they engage with the bristles 106. In instances of excessive force, the brush apparatus 100 is designed such that it moves away, thereby preventing any risk of failure or breakage to the mechanism. This movement triggers the rotation of cams, compressing the spring 104 and resulting in the brush device 102 retracting back into the downward position. This may become clearer as explained further below.

The brush device 102 includes a brush column or a brush shank 108 and a brush disc 116 with bristles 106 securely attached around its periphery. The brush disc 116 carries the bristles 106 The bristles 106 may be attached all over the column 108 to provide a wider access to the animals for interaction. The brush column 108 is further securely attached to the spring mechanism 104 that includes at least one spring. The brush column 108 has the universal joint motion 110 with the spring mechanism 104, i.e., it freely revolves around the point of attachment 110 with the spring mechanism 104 to pass on the actuating movement facilitated by the spring mechanism 104 to the brush column 108 for the brush device 102 to revolve freely in the universal motion defying any uni-directional motion. In an embodiment, the brush device 102 can also rotate around a brush column or shank 108, owing to the universal joints 110 and the spring-loaded mechanism 104.

The brush device 102 may have various design structures for carrying bristles 106 other than brush disc 116. In an exemplary structure, the brush column 108 carries the bristles 106 which may be removably attached to the brush column 108, for example, there may be a flexible sheet carrying the bristles 106 (may be referred as bristle sheet) which is removably attached to the brush column 108 using a Velcro mechanism. In another example, the bristles 106 or the bristle sheet may be permanently attached to the brush column 108. In situations of wear and tear of the brush device 102 after overtime usage, the bristles 106 may be changed when they are removably attached to the brush column 108. Otherwise, a new brush column 108 with attached brush discs 116 and bristles 106 may be directly attached to the spring mechanism 104 at the universal joint of attachment 110.

According to an embodiment of the present invention, the brush device 102 may also include a semi-spherical dome 112, featuring an array of bristles 114 securely attached to the semi-spherical dome 112. This provides a comprehensive coverage for effective scratching. This design ensures that animals can access the bristles from various angles, allowing for a thorough and satisfying scratching experience across a wider surface area.

Figure 2:
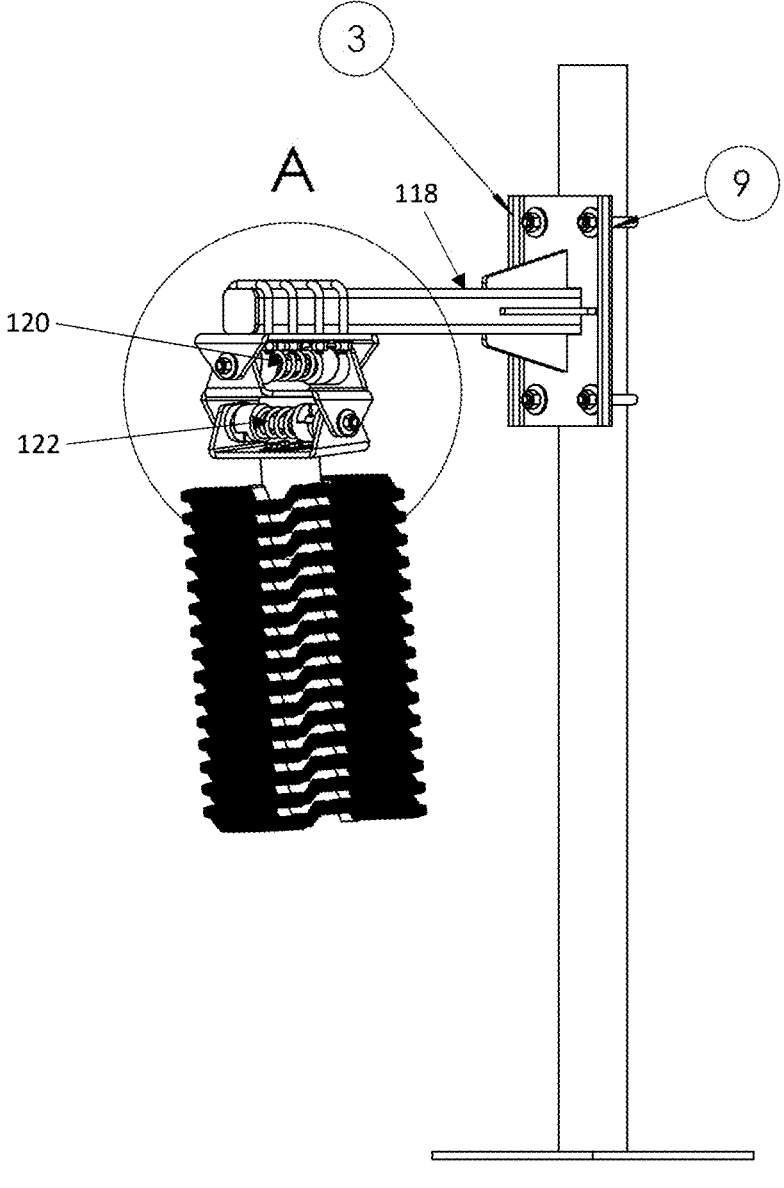
FIG. 2 illustrates another exemplary representation of a spring actuated livestock brush, in accordance with an embodiment of the present invention.
Figure 3:
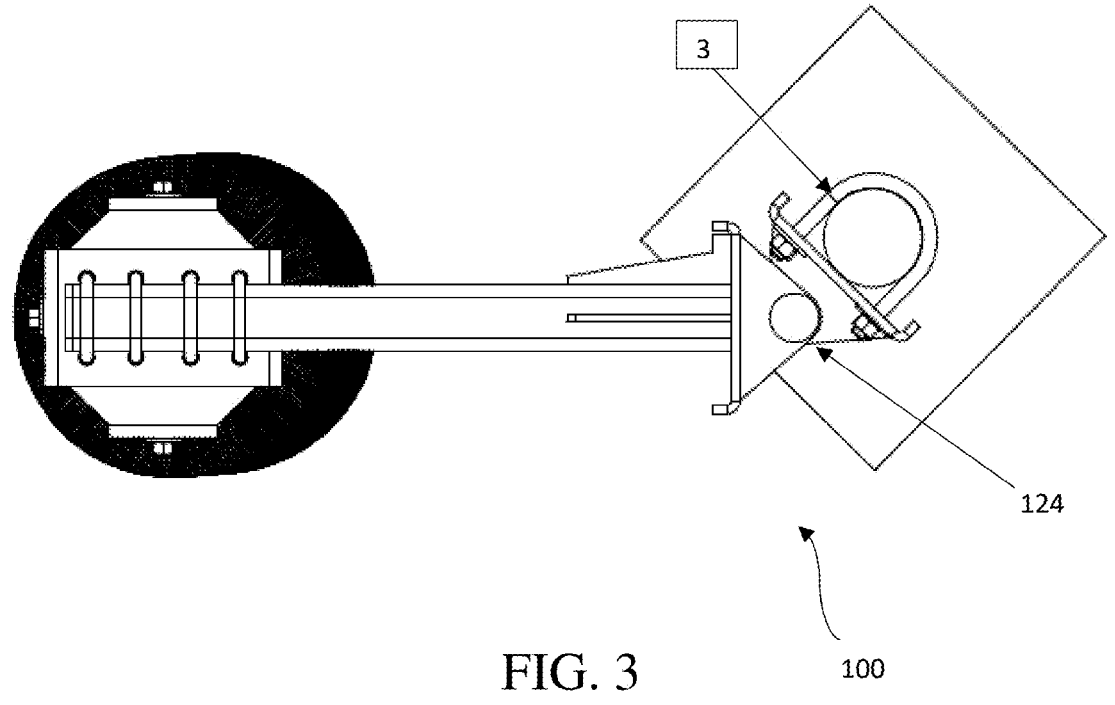
FIG. 3 illustrates an exemplary representation of a top view of a spring actuated livestock brush, in accordance with an embodiment of the present invention.
Figure 4:
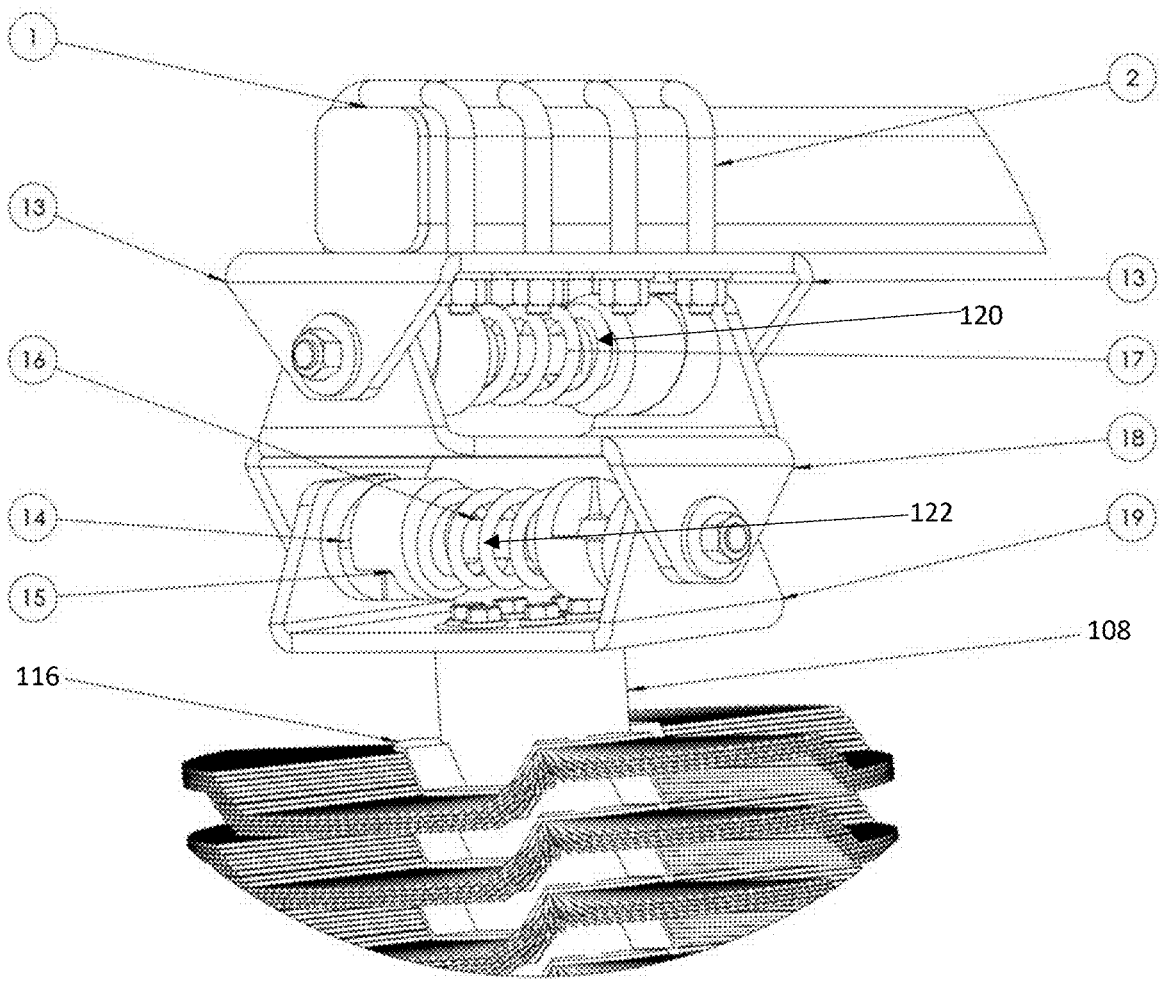
FIG. 4 illustrates an exemplary representation of a detailed view of a spring actuating mechanism equipped in the livestock brush, in accordance with an embodiment of the present invention.

Referring to the FIGS. 2-4, following numerals represent the components of the brush apparatus 100. It may be evident to a person of ordinary skill that the brush apparatus 100 may include all, or some or any combination of the following components, and may or may not include some of the following components.

1—SQUARE MOUNT PIPE
    2—U CLAMP
    3—MOUNT PIPE BRACKET ASM
    9—U CLAMP
    13—TOP PIPE MOUNT BRACKET
    14—CAM THROUGH HOLE
    15—CAM SQUARE HOLE
    16—SQUARE AXLE
    17—SPRING COMPRESSION
    18—COUPLING BRACKET
    19—BRUSH SHANK MOUNT BRACKET
    108—BRUSH SHANK
    116—BRUSH DISC

In an embodiment, the brush apparatus 100 may be devised for fixed installation within an animal enclosure for the benefit of animal usage. The brush apparatus 100 may include a mounting bracket (3) for secure attachment of the brush apparatus 100 to a building structure, such as including and not limited to a wall, a pillar, or analogous structure, in conjunction with a cantilever frame (118) extending from the mounting bracket (3).

Rereferring to the FIG. 3, according to an embodiment, the wall mount bracket (3) can be ingeniously designed with a built-in hinge mechanism 124, strategically positioned to enable seamless movement or revolution of the brush apparatus 100, when required, with respect to the wall or the building structure onto which the brush apparatus 100 is mounted. This may be helpful for the purpose of cleaning the floor beneath the brush. This structural feature also allows for effortless access to the area beneath the brush, ensuring convenient maintenance and upkeep of the surrounding environment.

Further, as shown in the FIGS. 2-5, the spring mechanism 104 may include a set of 2 springs (120, 122). It may be apparent to a person of ordinary skill in the art that the spring mechanism 104 may have any required number of springs that can actuate the brush device 102 and also can provide sufficient tension to ensure a gratifying scratching experience for animals as they engage with the bristles, without deviating from the meaning and scope of the present invention.

The spring mechanism 104 provides spring tension/resistance for a controlled and limited rotations of the springs (120, 122) which in turn revolves or moves the brush device 102 in a controlled and limited manner. As and when an animal approaches the brush apparatus 100, the animal interaction would cause the brush device 102 to revolve freely in any direction around the point of universal joint 110. However, a controlled tension is also provided by way of the spring mechanism 104, such that hayway or berserk movement of the brush device 102 is prevented. In other words, the set of two springs (120, 122) exerts a controlled resistance and tension on the brush device (102) for controlling the movement of the brush device (102). Thus, the spring mechanism 104 provides sufficient resistance for a controlled movement of the brush apparatus 100 preventing infinite movement, e.g., infinitely revolving, while also provides sufficient resistance such that when an animal pushes against it, it does not move freely or randomly, but puts resistive pressure against the animal's body for a good scratch.

The configuration of a cam device on the axle (14, 15, 16) in the brush device 102 provides for compression and decompression of the springs (120, 122). Under a normal interaction of an animal with the brush device 102 and/or under a normal operation of the brush apparatus 100, the springs (120, 122) are decompressed providing a tension to the brush device 102 for free directional but controlled revolution [FIG. 5a]. However, in instances of excessive forces, it triggers the rotation of cams (14, 15), compressing the spring 104 and resulting in the brush device 102 retracting backwards into the downward position, the brush apparatus 100 moves away from the animal, thereby preventing any risk of failure or breakage to the mechanism and/or the animal [FIG. 5b]. In the resting state, the two cams (14, 15) have matching offset surfaces mated to each other. One cam (14) is fixed, while the other cam (15) rotates with the brush. During aggressive revolution, the offset surfaces of the cams cause the rotating cam (15) to move inward, compressing the spring.

As a combined mechanical effort and impacts of the set of two springs (120, 122) and the respective cam device for each spring, the spring-like mechanism (104) exerts a controlled resistance and tension on the brush device (102) such that the brush devices 102 moves in a controlled but effective movement. This combination of mechanical output prevents random revolving of the brush device (102) during its operation, e.g., an animal interaction would, otherwise, cause the brush device 102 to revolve freely in any direction around the point of universal joint 110, but the mechanical impacts of the set of two springs (120, 122) and the respective cam devices control such randomness in the movement, still exerting controlled pressure against the animal's body for a scratch. Moreover, the combined mechanical effort and impacts of the set of two springs (120, 122) and the respective cam device also exerts a controlled restoring force to bring the brush device (102) back to its resting position in a controlled way, preventing it from a freely and limitlessly moving before and after its operation. This could help in energy saving and apparatus worn out.

Thus, the brush apparatus 100 has at least the following advantages: comparatively less opportunities for jamming; simple assembly using U-bolts; multiple mount options can be designed as required; same design principle can work with three sizes; all metal fabrication can be galvanized; compact packing as compared to competition.

It is intended that the disclosure and examples be considered as exemplary only. Though the present disclosure includes examples from livestocks, the brush apparatus disclosed herein may be employed at various other locations and environment as would be appreciated by one skilled in the art.

While certain embodiments have been described, these embodiments have been presented by way of example only, and are not intended to limit the scope of the present disclosure. Indeed, the novel methods, devices, and systems described herein may be embodied in a variety of other forms. Furthermore, various omissions, substitutions, and changes in the form of the methods, devices, and systems described herein may be made without departing from the spirit of the present disclosure.

The invention claimed is:

1. A livestock brush apparatus for tending to livestock comprising:

a brush device (102), mechanically actuated and controlled by a spring mechanism (104), incorporating a bristle section (106) intended for applying pressure against an animal's body for a scratch;

characterized in that the spring mechanism (104) includes at least a set of two springs (120, 122) exerting a defined resistance on the brush device (102) for controlling the movement of the brush device (102) with bristles;

wherein each spring is associated with a unique cam device, each cam device configured to actuate its respective spring, wherein each cam device includes at least one non-rotating cam (14) mounted on an axle (16) and one rotating cam (15) rotating on the axle (16) to compress or decompress its respective spring in the spring mechanism (104), depending on excessive or normal movement, respectively, of the brush device (102), wherein excessive movement is defined as an external force exerted on the brush device that exceeds a threshold value and normal movement is defined as an external force exerted on the brush device that does not exceed the threshold value;

characterized in that the brush device (102) is securely attached to the spring mechanism (104) via two hinge joints (110) connecting the set of two springs (120, 122);

wherein, by employing the set of two springs and the respective cam device for each spring, the spring mechanism (104) exerts a defined resistance on the brush device (102) for its controlled movement of the brush device (102) during its operation, while also exerts a controlled restoring force to bring the brush device (102) back to its resting position;

wherein, owing to the combined operation of the cam devices and the two hinge joints (110), the spring mechanism (104) is able to move and revolve the brush device (102) universally along any direction, and not just one type of motion.

2. The livestock brush apparatus of claim 1, wherein under normal interaction of an animal with the brush device (102) or in the resting position, the at least one rotating cam (15) and at least one non-rotating cam (14) mate with each other at their matching offset surfaces, and the respective spring is decompressed;

and wherein under excessive movement of the brush device (102), the offset surfaces of the at least one rotating cam (15) and at least one non-rotating cam (14) cause the rotatable cam (15) to move inward, compressing the respective spring, resulting in the brush device (102) retracting backwards into a downward position, thereby preventing any risk of failure or breakage to the brush apparatus (100) and/or the animal.

3. The livestock brush apparatus of claim 1, wherein the brush device (102) includes a brush column (108) and a brush disc (116) with bristles (106) securely attached around its periphery.

4. The livestock brush apparatus of claim 3, wherein the bristles (106) are attached all over the brush column (108) to provide a wider access to the animals for interaction.

5. The livestock brush apparatus of claim 3, wherein the brush device (102) includes a semi-spherical dome (112), featuring an array of bristles (114) securely attached to the semi-spherical dome (112) to provide a comprehensive coverage for effective scratching from various angles, allowing for a thorough and satisfying scratching experience across a wider surface area.

6. The livestock brush apparatus of claim 1, wherein the brush apparatus (100) further includes a mounting bracket (3) for secure attachment of the brush apparatus (100) to a building structure, such as including a wall, a pillar, or analogous structure, in conjunction with a cantilever frame (118) extending from the mounting bracket (3).

7. The livestock brush apparatus of claim 6, wherein the wall mount bracket (3) is designed with a built-in hinge mechanism (124), strategically positioned to enable seamless movement or revolution of the brush apparatus (100), with respect to the wall or the building structure onto which the brush apparatus (100) is mounted.

\* \* \* \* \*